United States Patent [19]

Carcia

Best Available Copy

[11] E Re. 30,313

[45] Reissued Jun. 24, 1980

[54] RESISTORS AND COMPOSITIONS THEREFOR

[75] Inventor: Peter F. Carcia, Wilmington, Del.

[73] Assignee: E. I. Du Pont de Nemours and Company, Wilmington, Del.

[21] Appl. No.: 862,381

[22] Filed: Dec. 20, 1977

Related U.S. Patent Documents

Reissue of:

[64] Patent No.: 3,974,107
Issued: Aug. 10, 1976
Appl. No.: 455,364
Filed: Mar. 27, 1974

[51] Int. Cl.[2] ..... H01B 1/06

[52] U.S. Cl. ..... 252/520; 252/518; 252/521; 338/308

[58] Field of Search ..... 252/520, 518, 521, 519, 252/63.2; 106/48, 53; 338/308; 428/539

[56] References Cited

U.S. PATENT DOCUMENTS

| | | | |
|---|---|---|---|
| 3,495,996 | 2/1970 | Delaney et al. | 106/49 |
| 3,583,931 | 6/1971 | Bouchard | 252/520 |
| 3,775,347 | 11/1973 | Bouchard | 252/518 |
| 3,846,829 | 11/1974 | Bouchard | 252/63.5 |

*Primary Examiner*—Benjamin R. Padgett
*Assistant Examiner*—J. L. Barr

[57] ABSTRACT

Powder compositions for producing high resistivity resistors capable of withstanding high voltage surges without large changes in resistivity, said compositions comprising finely divided pyrochlore-related oxides, lead glasses and metal titanates. Alternately to comprising titanates, the compositions may comprise metal titanate precursors such as crystallizable glasses capable of forming metal titanates upon being heated or titanium oxide plus a glass which react to form metal titanates.

50 Claims, No Drawings

RESISTORS AND COMPOSITIONS THEREFOR

Matter enclosed in heavy brackets [ ] appears in the original patent but forms no part of this reissue specification; matter printed in italics indicates the additions made by reissue.

BACKGROUND OF THE INVENTION

This invention relates to resistors, and more particularly, to film resistors capable of operating at high voltage, as well as compositions for making same.

Pyrochlore is a mineral of varying composition generally expressed as $(Na,Ca)_2(Nb,Ti)_2(O,F)_7$, but which approaches the simpler formulation $NaCaNb_2O_6F$. The structure of the mineral, established by characteristic X-ray reflections, has a cubic unit cell with dimensions of about 10.4 Angstroms and contains eight formula units of approximate composition $A_2B_2X_{6-7}$. The term pyrochlore is used interchangeably herein with the term pyrochlore-related oxide to mean oxides of the pyrochlore structure with the approximate formula $A_2B_2O_{6-7}$. Compounds of the pyrochlore-related (cubic) crystal structure are known to be useful as resistors. See, for example, Schubert U.S. Pat. No. 3,560,410, issued Feb. 2, 1971; Hoffman U.S. Pat. No. 3,553,109, issued Jan. 5, 1971; Bouchard U.S. Pat. No. 3,583,931, issued June 8, 1971; Popowich U.S. Pat. No. 3,630,969, issued Dec. 28, 1971; Bouchard U.S. Pat. No. 3,681,262, issued Aug. 1, 1972; and Bouchard U.S. Pat. No. 3,775,347, issued Nov. 27, 1973; each of which is incorporated by reference herein.

Such pyrochlore-based resistors have often been found to have deficiencies when compounded to achieve high resistivities. The high voltage handling capability of film resistors is important, since in certain demanding high voltage uses a resistor may operate at a voltage stress in the range 1000–3000 volts/inch (40–120 volts/mm), and may be exposed to brief (less than one second duration) voltage surges up to 30 kilovolts/inch. As a result of such a voltage surge, most resistors exhibit a permanent change in resistance of up to 50% of their pre-surge lower operating voltage resistance. Resistors are needed which can undergo high voltage surges without undergoing such large changes in resistivity.

The resistivity of presently available high resistivity resistors is normally quite dependent on the concentration of the conductive phase. Therefore, resistor compositions less dependent upon variations in concentration of the conductive phase are needed.

Thus, improved resistor compositions and resistors are needed where high resistivity (1 to 10 megohm per square) are desired, for example, in high voltage applications such as voltage divider networks, focus potentiometers, and other electrical networks.

SUMMARY OF THE INVENTION

This invention is film resistors adherent to a dielectric substrate. The resistor is adherent to the substrate by virtue of having been printed thereon using typical screen of stencil techniques, followed by firing to sinter or coalesce the deposited inorganic powders to produce a coherent, electrically continuous pattern on the substrate. The resistors comprise a conductive phase of particles of (1) pyrochlore-related oxides having the general formula $A_2B_2O_{6-7}$ and metal titanates; each of these types of crystalline particles are dispersed in a matrix of lead-containing glass. The glass contains at least 5 weight percent lead oxide dissolved therein. The resistors comprise about 5–15 weight percent of said metal titanate and preferably 10–50 weight percent of pyrochlore-related oxide, the remainder of the resistor being the aforementioned lead oxide containing glass.

The metal titanate preferably comprises a multivalent cation in addition to a titanium/oxygen titanate anion. Preferred titanate anions include $(TiO_3)^{2-}$. Preferred pyrochlores are lead ruthenate, bismuth ruthenate and lead iridate. It is preferred that the metal titanate comprise barium titanate, lead titanate and/or lead zirconate titanate.

Also a part of this invention are powder compositions useful for forming such resistors on dielectric substrates using thick-film techniques. The power compositions comprise the aforementioned pyrochlore-related oxides and one or more of the following titanium materials:

1. a metal titanate and a glass comprising at least 10 weight percent PbO dissolved therein, *and*

2. [one or more glasses at least one of which comprises at least 5 weight percent titanium dioxide dissolved therein and a metal oxide and is capable of crystallization to form a metal titanate upon being heated and 3.] titanium oxide and a glass comprising at least 10 weight percent PbO dissolved therein.

In titanium materials (1) and [(3)] *(2)*, the glass preferably comprises at least 50% by weight PbO dissolved therein. [In titanium material (2) the glass preferably comprises 50–70% PbO, 5–15% $TiO_2$, 15–35% $SiO_2$ and 0–15% $Al_2O_3$.] In titanium material [(3)] *(2)* the preferred titanium oxide is titanium dioxide, although oxygen deficient titanium oxides may also be employed.

In titanium materials (1) and (3), the glass preferably comprises at least 50% by weight PbO dissolved therein. In titanium material (2) the glass preferably comprises 50–70% PbO, 5–15% $TiO_2$, 15–35% $SiO_2$ and 0–15% $Al_2O_3$. In titanium material (3) the preferred titanium oxide is titanium dioxide, although oxygen deficient titanium oxides may also be employed.

In these powder compositions there is sufficient titanium material to produce an amount of metal titanate equal to 5–15 weight percent of the total weight of the inorganics present in the composition. Also in the powder compositions the amount of pyrochlore-related oxide is preferably 10–50 weight percent. The preferred pyrochlore-related oxides are lead ruthenate, bismuth ruthenate, and lead iridate. It is preferred in the powder compositions that the metal titanate be of a multivalent cation, that is, a cation having a positive valence of at least +2. In titanium material (2) [it is preferred that the metal oxide capable of forming a metal titanate also be multivalent; in titanium material (3),] it is preferred that the glass comprise a large amounts of PbO and/or other multivalent cations.

The powder cmpositions of this invention may optionally be dispersed in an inert vehicle such as is typically used in thick-film techniques; the inert vehicle is typically a liquid.

DETAILED DESCRIPTION OF THE INVENTION

The resistors of this invention have enhanced ability to withstand high voltage; also the resistivity of resistors of this invention is less sensitive to variations in concentration of the conductive phase. The conductive phase in the resistors of this invention is one or more pyrochlore-related oxides. Particles of the conductive phase are dispersed in a glassy lead-containing matrix, along with particles of a metal titanate. The metal titanate is, as shown by the examples, responsible for the improved performance of the resistors of this invention.

The metal titanate serves to (1) raise the resistivity of the resistor relative to compositions having the same amount of conductive phase (pyrochlore) and (2) to enhance the voltage withstanding capacity of the resistor. It is thought that the increase in resistivity is likely caused by additional segregation of the conductive phase in the presence of the titanate. The metal titanate detracts from the role of the glass as a liquid phase sintering aid for the pyrochlore, with conductive phase segregation the result. It is thought that the metal titanate-based dielectrics improve voltage withstanding capability because of their ability to store the electrical energy in the form of a polarization, instead of expenditure of that energy in the form of electric currents which cause permanent changes in the microstructure and thus permanent changes in resistance.

The metal titanates in the resistors of this invention, and in the powder compositions in one of the embodiments of this invention, are crystalline materials and comprise a metal cation and a titanate anion. The titanates may be represented by the general formula $[M]_a[Ti_xO_y]_b$ where the total positive charge of the cation(s) M and the total negative charge of the anions $[Ti_xO_y]$ are equal. Thus, where M is univalent, the titanate may be $(M^{+1})_2TiO_3$; where M is divalent the titanate may be $M^{+2}TiO_3$; where M is trivalent the titanate may be $(M^{+3})_2(TiO_3)_3$, etc.

The titanate anion may be $(TiO_3)^{2-}$ as in $ATiO_3$ materials of the ilmenite structure where A is $Fe^{+2}$, $Ni^{+2}$, $Mn^{+2}$, $Mg^{+2}$; it may be $(TiO_4)^{2-}$ as in $A_2TiO_4$ materials of the spinel structure where A is $Ni^{+2}$, $Mn^{+2}$, etc.; it may be $(TiO_3)^{2-}$ as in the perovskite structure where A is $Ca^{+2}$, $Ba^{+2}$, $Sr^{+2}$, $Pb^{+2}$; it may be $(Ti_2O_7)^{6-}$ as in the distorted cubic structures $A_2Ti_2O_7$ where A is $Bi^{+3}$; it may be $(TiO_4)^{4-}$ of the $K_2SO_4$ crystalline structure $A_2TiO_4$ where A is $Ca^{+2}$, $Ba^{+2}$. The above list of metal titanates is illustrative only.

Preferred metal titanates include $PbTiO_3$, $BaTiO_3$, $CaTiO_3$, $FeTiO_3$, $SrTiO_3$, and PZT ($Pb_{1.0}Zr_{0.57}T_{0.43}O_3$), especially as components of the powder compositions of this invention.

The metal titanates are preferably 5–15% by weight of the resistor, and of the powder composition (unless formed in situ). Generally, at least 5% metal titanate is present to achieve significant resistor property improvements. Amounts of metal titanates in excess of 15 weight percent, while improving voltage characteristics, tend to cause high negative temperature coefficient of resistance, TCR (e.g., greater than 1000 p.p.m./°C.). A negative TCR means that the resistance varies negatively with temperature.

The metal cation in the metal titanates may be any metal cation, including those of Groups I through V, Periodic Table of Elements (Metals Handbook, Am. Soc. Metals, 8th Ed., 1961, Vol. 1, p. 42) This, of course, includes the alkali and alkaline earth cations of Groups I and II, the transition elements of Groups III and IV, and the heavier metals of Group V (As, Sb, Ti). The maximum atomic number of the metals is hence that of bismuth (83). It is preferred that the metals be multivalent, i.e., more than univalent. Hence, the univalent alkali metals are not preferred.

The pyrochlore-related oxide (also referred to as pyrochlores herein) include polynary oxides of the formula $(M_xBi_{2-x})(M'_yRu_{2-y})O_{7-z}$, wherein M is at least one metal selected from the group consisting of yttrium, indium, cadmium, lead and the rare earth metals of atomic number 57–71, inclusive;

M' is at least one metal selected from the group consisting of platinum, titanium, tin, chromium, rhodium, iridium, zirconium, antimony and germanium;

x is a number in the range 0–2;

y is a number in the range 0–2; and z is a number in the range 0–1, being at least equal to about x/2 when M is a divalent metal.

Also included are the pyrochlores disclosed in commonly assigned Bouchard and Rogers USSN 326,955, filed Jan. 25, 1973, now U.S. Pat. No. 3,896,055, of the formula $$M_xM'_{2-x}M''_2O_{7-z}$$

wherein:

M is at least one of Ag or Cu;

M' is Bi or a mixture of at least one half Bi plus up to one half of one or more cations from among a. bivalent Cd or Pb and b. trivalent Y, Tl, In and rare earth metals of atomic number 57–71, inclusive;

M'' is at least one of a. Ru, b. Ir, and c. a mixture of at least three-fourths of at least one of Ru and Ir and up to one-fourth of at least one of Pt, Ti and Rh;

x is in the range 0.10 to 0.60 (preferably 0.10 to 0.5) and z is in the range 0.10 to 1.0, and is equivalent to the sum of monovalent cations M and half of divalent cations in the polynary oxide.

Optimum pyrochlores include $Pb_2Ru_2O_6$, $Bi_2Ru_2O_7$, $Pb_2Ir_2O_6$, and $Bi_2Ir_2O_7$.

The glasses used in the powder compositions of the present invention are lead-containing glasses (they comprise at least 10% PbO, preferably 50–80% PbO, along with other glass forming oxides such as $SiO_2Al_2O_3$, $TiO_2$, ZnO, BaO, $P_2O_5$, $V_2O_5$, etc.).

[Where the metal titanate is to be provided in the resistor by in situ crystallization of the glass during firing, a crystallizable $TiO_2$-containing glass is used in the desired quantities. The glass normally contains at least 5% $TiO_2$ dissolved therein, and also a metal oxide. Exemplary of such crystallizable glasses are those of Stookey U.S. Pat. No. 2,920,971, issued Jan. 12, 1960. Useful crystallizable glasses also include lead titanium silicates and aluminosilicates of]

[50–70% PbO]

[5–15% $TiO_2$]

[15–35% $SiO_2$]

[0–15% $Al_2O_3$]

[Optimum crystallizable glasses 60% PbO, 7% $TiO_2$, 32% $SiO_2$ and 1% $Al_2O_3$.]

Where the powder composition [contains neither] *does not contain* preformed metal titanates [nor a crystallizable $TiO_2$-containing glass,] it [may comprise] *comprises* a mixture of titanium oxide and a glass which reacts therewith (or firing) to form metal titanates. Such glasses comprise, dissolved therein, at least 10% PbO, preferably 50–80% PbO, and optionally other preferred metal oxides such as BaO, $Bi_2O_3$, etc. By titanium oxide is meant $TiO_2$ or any of the well-known oxygen deficient titanium oxide such as those mentioned by A. F. Wells in Structural Inorganic Chemistry, Oxford, Clarendon Press, 3rd Edition, 1962, p. 475. $TiO_2$ is preferred.

The relative amounts of pyrochlore and glass in the resistors and resistor compositions of this invention are selected according to generally known principles dependent upon the desired resultant properties. Generally, for these high resistivity resistors the amount of pyrochlore in the resistors and in the resistor compositions (on a solids basis) will be 10–50%, preferably 15–45%. The amount of glass in the resistors, and in resistor compositions wherein the titanates are not to be formed in situ, will be the difference between total weight of pyrochlore (10–50%) and titanate (5–15%) and 100%, or 35–85% glass.

Optimum compositions according to this invention are of 7.3% $BaTiO_3$, 21.7% $Pb_2Ru_2O_6$ and 71% lead aluminosilicate glass.

The resistor (powder) compositions of the present invention may be printed on any conventional dielectric substrate (e.g., alumina, ceria, etc.) using thick-film techniques. By "thick film" is meant films obtained by printing dispersions of powders (usually in an inert liquid vehicle) on a substrate using techniques such as screen and stencil printing, as opposed to the so-called "thin" films deposited by evaporation or sputtering. Thick-film technology is discussed generally in Handbook of Materials and Processes for Electronics, C. A. Harper, Editor, McGraw-Hill, New York, 1970, Chapter 11.

The powders are sufficiently finely divided to be used in conventional screen or stencil printing operations and to facilitate sintering. The compositions are prepared from the solids and vehicles by mechanical mixing and printed as a film on ceramic dielectric substrates in the conventional manner. Any inert liquid may be used as the vehicle. Water or any one of various organic liquids, with or without thickening and/or stabilizing agents and/or other common additives, may be used as the vehicle. Exemplary of the organic liquids which can be used are the aliphatic alcohols; esters of such alcohols, for example, the acetates and propionates; terpenes such as pine oil, terpineol and the like; solutions of resins such as the polymethacrylates of lower alcohols, or solutions of ethylcellulose, in solvents such as pine oil and the monobutyl ether of ethylene glycol monoacetate. The vehicle may contain or be composed of volatile liquids to promote fast setting after application to the substrate.

The ratio of inert liquid vehicle to solids in the dispersions may vary considerably and depends upon the manner in which the dispersion is to be applied and the kind of vehicle used. Generally, from 0.2 to 20 parts by weight of solids per part by weight of vehicle will be used to produce a dispersion of the desired consistency. Preferred dispersions contain 20–70% vehicle.

The printed pattern is normally dried at 100°–150° C.to remove solvent. Firing or sintering of the powder compositions of the present invention normally occurs at temperatures in the range 750°–950° C., for 5 minutes to 2 hours, depending on the particular compositions employed and the desired degree of sintering, as will be known to those skilled in the art. Generally, shorter firing times may be employed at higher temperatures. As one skilled in the art knows when crystallizable glasses are used, heating should be sufficiently long to permit nucleation and crystal formation.

EXAMPLES

The following examples are presented to illustrate the invention. In the examples and elsewhere in the specification and claims all parts, percentages, and ratios are by weight, unless otherwise stated.

The high voltage handling capability of film resistors was evaluated by subjecting the resistors to stress (stressed) at voltage gradients up to 50 kilovolts/inch (127 kv/cm) for 15 seconds. Resistance before stress (Ro) was compared with resistance after stress ($R_{ref}$), each measured at low stress (typically 500 volts/mm.) and the percent permanent change in resistance was defined as $$\% \Delta R_{perm} = \frac{R_o \times R_{ref}}{R_o} \times 100$$

The resistors were prepared as follows. A dispersion or paste of the seven parts of the solids indicated below in three parts an inert liquid vehicle (1/9 ethylcellulose/terpineol) was prepared by conventional roll-milling techniques. The paste was printed on Alsimag 614 alumina substrates bearing prefired Pd/Ag (1/2.5) electrode terminations, using a 200-mesh screen to print 25 mm square patterns. The pattern was dried at 150° C. in an air oven for 15 minutes (to a thickness of about 25 microns) and then fired in a belt furnace to a maximum temperature of about 850° C. (about 8 minutes at peak); total furnace residence time was about 45–60 minutes. The dried print about 17 microns thick.

The glasses used in the Examples are designated A, B and C therein, and are identified in Table I.

TABLE 1

GLASSES USED IN EXAMPLES (WT. %)

| Glass A | Glass B | Glass C |
|---|---|---|
| 65.0% PbO | 32.0% PbO | 60.0% PbO |
| 34.0% $SiO_2$ | 27.0% $SiO_2$ | 32.0% $SiO_2$ |
| —1.0% $Al_2O_3$ | 11.0% $Al_2O_3$ | 1.0% $Al_2O_3$ |
| | 12.0% $TiO_2$ | 7.0% $TiO_2$ |
| | 10.0% ZnO | |
| | 8.0% BaO | |

The inorganic materials used herein, and their relative proportions, are set forth in Tables II–V. The powders were each finely divided (by conventional milling techniques), the surface areas being for pyrochlore-related oxides, 9.0–14.0 $m.^2/g.$, for titanate powders 4.0–5.0 $m.^2/g.$, for glasses 6.0–8.0 $m.^2/g.$, and for $TiO_2$ 9 $m.^2/g.$

EXAMPLES 1-3; SHOWINGS A-C (TABLE II)

In Examples 1-3 and Showings A and C (Table II) the conductive phase and glass were the same. In examples 1-3, barium titanate ($BaTiO_3$) were added. Each was stressed, as indicated in Table II, at 700 or 1000 volts/mm. The Examples comprising barium titanate were found to exhibit a percent permanent change in resistivity which was about an order of magnitude less than that observed where barium titanate was absent.

To emphasize that not any crystalline phase will function to reduce change in resistivity, a crystallizing glass which forms crystals other than titanate was employed in Showing B. the major crystalline phase formed in the glass after firing was $BaAl_2Si_2O_8$; a minor amount (probably much less than 3% of the total composition)

of $Al_2TiO_5$ may have been formed. The percent permanent change in resistivity was similar to that of Showings A and C.

TABLE II

| | Conductive Phase (wt. %) | Glass Phase (wt. %) | $BaTiO_2$ (wt. %) | R (Sheet Resistivity) (kohm/square) | V (Voltage Stress) (volts/mm.) | $\Delta R_{perm.}$ (% Perm. Resist. Change) |
|---|---|---|---|---|---|---|
| Example 1 | $Pb_2Ru_2O_6$ (35.2) | Type A (57.7) | 7.1 | 110 | 700 | 1.5 |
| Example 2 | $Pb_2Ru_2O_6$ (28.6) | Type A (64.3) | 7.1 | 350 | 1000 | 2.0 |
| Example 3 | $Pb_2Ru_2O_6$ (24.3) | Type A (68.6) | 7.1 | 875 | 1000 | 0.6 |
| Showing A | $Pb_2Ru_2O_6$ (21.0) | Type A (79.0) | — | 123 | 700 | 14.0 |
| Showing B | $Pb_2Ru_2O_6$ (23.6) | Type B (76.4) | — | 102 | 700 | 12.0 |
| Showing C | $Pb_2Ru_2O_6$ (19.5) | Type A (80.5) | 0.0 | 523 | 1000 | 12.0 |

EXAMPLES 4–9; SHOWING D (TABLE III)

Resistors of higher sheet resistivity than those of Table II were examined here. The same conductive phase (lead ruthenate) was used throughout, but the titanate additive was varied; the latter was provided to the fired resistor by including a titanate powder to the printing paste (barium titanate at various levels in Examples 4 and 5; lead titanate in Example 6); by adding lead titanate zirconate powder to the paste (Example 7); by adding $TiO_2$ powder to paste, which reacted with the glass to form a titanate on firing (Example 8); or by using a glass which partially crystallizes to lead titanate on firing (Example 9).

Showing D used a composition not of this invention, lead ruthenate and the noncrystallizing glass of Examples 4–8, but no titanates or titanate-formers; however, the sheet resistivity was similar to that of Examples 4–9. Table III shows compositions and results.

$BaTiO_3$ additions of 7.3% and 14.3% (Examples 4 and 5, respectively) to compositions containing $Pb_2Ru_2O_6$ and lead aluminosilicate glass result in nearly two order of magnitude decrease of the permanent resistance change, after voltage stressing at 1000 v/mm, over Comparative Showing D without $BaTiO_3$.

Examples 6 and 7 emphasize that improved voltage properties may also be obtained with additions of other titanate-based dielectric, namely $PbTiO_3$ and PZT.

In Example 8, $TiO_2$ was added to a $Pb_2Ru_2O_6$/lead aluminosilicate composition. X-ray diffraction data for the fired resistors revealed that the $TiO_2$ had combined during firing with the lead-based glass to form $PbTiO_3$. The voltage properties were superior to those of Comparative Showing D.

In Example 9, $PbTiO_3$ was introduced into the final resistor composition using a crystallizable glass. Again the permanent resistance change after voltage stressing is significantly smaller than for Comparative Showing D.

TABLE III

| | Conductive Phase (wt. %) | Glass Phase (wt. %) | Additive (wt. %) | R (Sheet Resistivity) (Megohm/square) | V (Voltage Stress) (volts/mm) | $\Delta R_{perm}$ (% Perm. Resist. Change) |
|---|---|---|---|---|---|---|
| Showing D | $Pb_2Ru_2O_6$ (17.4) | Type A (82.6) | — | 1.00 | 1000 | 25.0 |
| Example 4 | $Pb_2Ru_2O_6$ (21.7) | Type A (71.0) | $BaTiO_3$ (7.3) | 1.48 | " | 0.3 |
| Example 5 | $Pb_2Ru_2O_6$ (21.4) | Type A (64.3) | $BaTiO_3$ (14.3) | 2.58 | " | 0.3 |
| Example 6 | $Pb_2Ru_2O_6$ (29.0) | Type A (63.8) | $PbTiO_3$ (7.2) | 1.70 | " | 1.7 |
| Example 7 | $Pb_2Ru_2O_6$ (29.0) | Type A (63.8) | PZT* (7.2) | 1.17 | " | 3.0 |
| Example 8 | $Pb_2Ru_2O_6$ (29.0) | Type A (63.8) | $TiO_2$ (7.2) | 1.06 | " | 0.9 |
| Example 9 | $Pb_2Ru_2O_6$ (16.1) | Type C (83.9) | — | 2.19 | " | 1.0 |

*PZT or lead zirconate titanate has the approximate composition $Pb_{1.0}Zr_{9.97}Ti_{9.42}O_3$.

TABLE IV

| | Conductive Phase (wt. %) | Glass Phase (wt. %) | $BaTiO_3$ (wt. %) | R(Sheet Resistivity) (megohm/square) | V (Voltage Stress) (volt/mm) | $\Delta R_{perm.}$ (% Perm. Resist. Change) |
|---|---|---|---|---|---|---|
| Showing E | $Bi_2Ru_2O_2$(21.0) | Type A (79.0) | — | 1.67 | 1000 | 38.0 |
| Example 10 | $Bi_2Ru_2O_7$ (29.4) | Type A (63.2) | 7.4 | 1.84 | " | 0.8 |
| Showing F | $Pb_2Ir_2O_6$ (36.2) | Type A (63.8) | — | 1.55 | 200 | 55.0 |
| Example 11 | $Pb_2Ir_2O_6$ (41.1) | Type A (53.4) | 5.5 | 10.92 | 200 | 0.4 |

EXAMPLES 10 and 11; SHOWINGS E AND F (TABLE IV)

The effectiveness of titanates in reducing permanent change in resistivity after high voltage stress using other pyrochlore-related oxides is illustrated by these Examples and Showings. Compositions and data are set forth in Table IV.

EXAMPLES 12, 13, 14, and 15; SHOWINGS G AND H (TABLE V)

Showings G and H emphasize the major impediment to easy manufacture of high resistivity compositions. Only a very small difference in the weight percent conductive phase (1.3%) causes a change in resistance of one order of magnitude (1 to 10 megohms per square). This property is responsible for lack of reproducibility in the manufacture of high resistivity compositions.

In Examples 12 and 13, additions of $BaTiO_3$ show that a much greater difference (9.8%) in the conductive phase concentration is possible for sheet resistivities in that range. Hence, barium titanate additions make the high resistivity compositions much less sensitive to pyrochlore concentration.

In Examples 14 and 15, where a crystallizable glass is used, the conductive phase increment is 8.7% for 1 megohm/square and 10 megohms/square sheet resistivities, again a substantial improvement over that in Showings G and H.

TABLE V

| | Conductive Phase (wt. %) | Glass Phase (wt. %) | $BaTiO_3$ (wt. %) | R (Sheet Resistivity) (megohm/square) | Change in Wt. % Conductive Phase |
|---|---|---|---|---|---|
| Showing | $Pb_2Ru_2O_6$ (18.4) | Type A (81.6) | — | 1 | 1.3 |
| Showing H | $Pb_2Ru_2O_6$ (17.1) | Type A (82.9) | — | 10 | |
| Example 12 | $Pb_2Ru_2O_6$ (41.2) | Type A (51.4) | 7.4 | 1 | 9.8 |
| Example 13 | $Pb_2Ru_2O_6$ (31.4) | Type A (61.2) | 7.4 | 10 | |
| Example 14 | $Pb_2Ru_2O_6$ (42.0) | Type C (58.0) | — | 1 | 8.7 |
| Example 15 | $Pb_2Ru_2O_6$ (33.3) | Type C (66.7) | — | 10 | |

Showings J, K, and L

The unique effect of titanates in enhancing voltage-withstanding ability is illustrated by these Showings, which use bismuth stannate, $(Bi)_2(SnO_3)_3$; lead zirconate, $PbZrO_3$; and lead niobate, $PbNb_2O_6$. The composition and data are:

Showing J $Pb_2Ru_2O_6$, 29.0%
Type A Glass, 63.8%
$Bi_2(SnO_3)_3$, 7.2%
R, 0.94 megohm/square
Voltage stress, 1000 volts/mm
$\Delta R_{perm.}$, 14.0%

Showing K $Pb_2Ru_2O_6$, 29.4%
Type A Glass, 63.2%
$PbZrO_3$, 7.4%
R, 187 Kohms/square
Voltage stress, 700 volts/mm
$\Delta R_{perm.}$, 23%

Showing L $Pb_2Ru_2O_6$, 29.0%
Type A Glass, 63.8%
$PbNb_2O_6$, 7.2%
R, 200 Kohms/square
Voltage stress, 700 volts/mm
$\Delta R_{perm.}$, 23%

I claim:

1. A film resistor adherent to a dielectric substrate wherein the resistor comprises a conductive phase of crystalline particles of (1) pyrochlore-related oxides and (2) metal titanates, each dispersed in a matrix of a lead containing glass, said [pyrochlore-related oxides being selected from among those of formula $$(M_xBi_{2-x})(M'_yRu_{z-y})O_{7-z},$$

wherein

M is at least one metal selected from the group consisting of yttrium, indium, cadmium, lead, and the rare earth metals of atomic number 57–71, inclusive;

M′ is at least one metal selected from the group consisting of platinum, titanium, tin, chromium, rhodium, iridium, zirconium, antimony, and germanium;

x is a number in the range 0–2;

y is a number in the range 0–2; and z is a number in the range 0–1, being at least equal to about x/2 when M is a divalent metal; those of the formula $$M_xM'_{2-x}M''_2O_{7-z},$$

wherein

M is at leat one of Ag or Cu;

M′ is Bi or a mixture of at least one half Bi plus up to one half of one or more cations from among a. bivalent Cd or Pb and b. trivalent Y, Tl, In, and rare earth metals of atomic number 57–71, inclusive;

M″ is at least one of a. Ru, b. Ir, and c. a mixture of at least three-fourths of at least one of Ru and Ir and up to one-fourth of at least one of Pt, Ti, and Rh;

x is in the range 0.10 to 0.60, and z is in the range 0.10 to 1.0, and is equivalent to the sum of monovalent cations M and half of divalent cations in said formula; and mixtures thereof] *resistor being a sintered composition of claim 19.*

[2. A resistor according to claim 1 comprising 5–15 weight percent of said metal titanate.]

[3. A resistor according to claim 1 wherein said glass contains at least 5 weight percent PbO dissolved therein.]

[4. A resistor according to claim 2 wherein said glass contains at least 5 weight percent PbO dissolved therein.]

[5. A film resistor according to claim 1 wherein said metal titanate comprises a multivalent cation.]

[6. A film resistor according to claim 2 wherein said metal titanate comprises a multivalent cation.]

[7. A film resistor according to claim 1 where the anion in said titanate is $(TiO_3)^{2-}$.]

[8. A film resistor according to claim 2 where the anion in said titanate is $(TiO_3)^{2-}$.]

[9. A film resistor according to claim 5 where the anion in said titanate is $(TiO_3)^{2-}$.]

[10. A film resistor according to claim 6 where the anion in said titanate is $(TiO_3)^{2-}$.]

[11. A film resistor according to claim 1 comprising 10–50 weight percent pyrochlore-related oxide.]

[12. A film resistor according to claim 2 comprising 10–50 weight percent pyrochlore-related oxide.]

[13. A resistor according to claim 1 wherein the pyrochlore-related oxide is $Pb_2Ru_2O_6$.]

[14. A film resistor according to claim 1 wherein said pyrochlore-related oxide is $Bi_2Ru_2O_7$.]

[15. A film resistor according to claim 1 wherein said pyrochlore-related oxide is $Pb_2Ir_2O_6$.]

[16. A resistor according to claim 1 wherein said titanate comprises barium titanate.]

[17. A resistor according to claim 1 wherein said titanate comprises lead titanate.]

[18. A resistor according to claim 1 wherein said titanate comprises lead zirconate titanate.]

19. A powder composition useful for forming film resistors on a dielectric substrate, the powder comprising pyrochlore-related oxides and a titanium material selected from the class consisting of 1. a metal titanate and a glass comprising at least 10 weight percent PbO dissolved therein, *and*
2. [one or more glasses at least one of which comprises at least 5 weight percent titanium dioxide dissolved therein and a metal oxide and is capable of crystallization to form a metal titanate upon being heated and] [3.]titanium oxide and a glass comprising at least 10 weight percent PbO dissolved therein, said pyrochlore-related oxides being selected from among those of the formula $$(M_xBi_{2-x})(M'_yRu_{2-y})O_{7-z},$$

wherein

M is at least one metal selected from the group consisting of yttrium, indium, cadmium, lead, and the rare earth metals of atomic number 57–71, inclusive;

M' is at least one metal selected from the group consisting of platinum, titanium, tin, chromium, rhodium, iridium, zirconium, antimony, and germanium, x is a number in the range 0–2;

y is a number in the range 0–2; and z is a number in the range 0–1, being at least equal to about x/2 when M is a divalent metal; those of the formula $M_xM'_{2-x}M''_2O_{7-7}$, wherein M is at least one of Ag or Cu;

M' is Bi or a mixture of at least one half Bi plus up to one half of one or more cations from among a. bivalent Cd or Pb and b. trivalent Y, Tl, In, and rare earth metals of atomic number 57–71, inclusive;

M'' is at least one of a. Ru, b. Ir, and c. a mixture of at least three-fourths of at least one of Ru and Ir and up to one-fourth of at least one of Pt, Ti, and Rh;

x is in the range 0.10 to 0.60, and z is in the range 0.10 to 1.0, and is equivalent to the sum of monovalent cations M and half of divalent cations in said formula; and mixtures thereof.

20. A composition according to claim 19 comprising titanium material (1).

21. A composition according to claim 20 wherein said glass comprises at least 50% PbO dissolved therein.

22. A composition according to claim 19 comprising titanium material (2).

[23. A composition according to claim 22 wherein said glass comprises 50–70% PbO, 5–15% $TiO_2$, 15–35% $SiO_2$ and 0–15% $Al_2O_3$.]

[24. A composition according to claim 19 comprising titanium material (3).]

25. A composition according to claim [24] *22* wherein said glass comprises at least 50% PbO dissolved therein.

26. A composition according to claim [24] *22* wherein said titanium oxide is $TiO_2$.

27. A composition according to claim 25 wherein said titanium oxide is $TiO_2$.

28. A powder composition according to claim 20 comprising sufficient titanium material to produce an amount of metal titanate equal to 5–15 weight percent of the total composition weight.

29. A powder composition according to claim 22 comprising sufficient titanium material to produce an amount of metal titanate equal to 5–15 weight percent of the total composition weight.

30. A powder composition according to claim [24] *27* comprising sufficient titanium material to produce an amount of metal titanate equal to 5–15 weight percent of the total composition weight.

31. A powder composition according to claim 19 wherein said pyrochlore-related oxide is $Pb_2Ru_2O_6$.

32. A powder composition according to claim 19 wherein said pyrochlore-related oxide is $Bi_2Ru_2O_7$.

33. A powder composition according to claim 19 wherein said pyrochlore-related oxide is $Pb_2Ir_2O_6$.

34. A powder composition according to claim 20 wherein said pyrochlore-related oxide is $Pb_2Ru_2O_6$.

35. A powder composition according to claim 20 wherein said pyrochlore-related oxide is $Bi_2Ru_2O_7$.

36. A powder composition according to claim 20 wherein said pyrochlore-related oxide is $Pb_2Ir_2O_6$.

37. A powder composition according to claim 22 wherein said pyrochlore-related oxide is $Pb_2Ru_2O_6$.

38. A powder composition according to claim 22 wherein said pyrochlore-related oxide is $Bi_2Ru_2O_7$.

39. A powder composition according to claim 22 wherein said pyrochlore-related oxide is $Pb_2Ir_2O_6$.

40. A powder composition according to claim [24] *27* wherein said pyrochlore-related oxide is $Pb_2Ru_2O_6$.

41. A powder composition according to claim [24] *27* wherein said pyrochlore-related oxide is $Bi_2Ru_2O_7$.

42. A powder composition according to claim [24] *27* wherein said pyrochlore-related oxide is $Pb_2Ir_2O_6$.

43. A composition according to claim 20 wherein the metal in said metal titanate is multivalent.

44. A composition according to claim 22 wherein the metal in said metal oxide is multivalent.

45. A composition according to claim 19 comprising 10–50 weight percent pyrochlore-related oxide.

46. A composition according to claim 20 comprising 10–50 weight percent pyrochlore-related oxide.

47. A composition according to claim 22 comprising 10–50 weight percent pyrochlore-related oxide.

48. A composition according to claim [24] *27* comprising 10–50 weight percent pyrochlore-related oxide.

49. The composition of claim 19 dispersed in an inert liquid vehicle.

50. The composition of claim 20 dispersed in an inert liquid vehicle.

51. The composition of claim 22 dispersed in an inert liquid vehicle.

52. The composition of claim [24] *27* dispersed in an inert liquid vehicle.

53. The composition of claim 45 dispersed in an inert liquid vehicle.

*54. A film resistor adherent to a dielectric substrate wherein the resistor comprises a conductive phase of crystalline particles of (1) pyrochlore-related oxides and (2)*

*metal titanates, each dispersed in a matrix of a lead containing glass, said resistor being a sintered composition of claim 20.*

*55. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 21.*

*56. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 22.*

*57. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 25.*

*58. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 26.*

*59. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 27.*

*60. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 28.*

*61. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 29.*

*62. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 30.*

*63. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 31.*

*64. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 32.*

*65. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 33.*

*66. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 45.*

*67. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 46.*

*68. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 47.*

*69. A film resistor adherent to a dielectric substrate wherein the resistor comprises a conductive phase of crystalline particles of (1) pyrochlore-related oxides and (2) metal titanates, each dispersed in a matrix of a lead containing glass, said resistor being a sintered composition of claim 48.*

* * * * *